(12) United States Patent
Li

(10) Patent No.: US 6,301,315 B1
(45) Date of Patent: Oct. 9, 2001

(54) METHODS AND SYSTEMS FOR SYMBOL ESTIMATION IN A RECEIVER

(75) Inventor: Ye Li, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,482

(22) Filed: Dec. 22, 1999

(51) Int. Cl.[7] .............. H03D 1/04; H03D 1/06; H03K 5/01; H03K 6/04; H04B 1/10; H04L 1/00; H04L 25/08
(52) U.S. Cl. ............... 375/346; 375/285; 375/229
(58) Field of Search ........................ 375/346, 350, 375/229, 262, 287, 284, 285, 340, 341, 343

(56) References Cited

U.S. PATENT DOCUMENTS

| | | | |
|---|---|---|---|
| 5,117,441 | * 5/1992 | Weigand | 375/336 |
| 5,249,200 | * 9/1993 | Chen et al. | 375/285 |
| 5,546,430 | * 8/1996 | Liao et al. | 375/341 |
| 5,784,415 | * 7/1998 | Chevillat et al. | 375/341 |
| 5,963,598 | * 10/1999 | Shukhman et al. | 375/341 |
| 6,115,435 | * 9/2000 | Harada et al. | 375/341 |

OTHER PUBLICATIONS

Simon Haykin, An Introduction to Analog and Digital Communications, published 1989 by Willey & Son, Inc., pp. 250–251.*

* cited by examiner

*Primary Examiner*—Chi Pham
*Assistant Examiner*—Phuong Phu

(57) ABSTRACT

The present invention provides systems and methods for mitigating interference on a received signal by providing an equalizer having a truncated response time preceded by a linear filter which compensates for the truncated response time. The invention also provides methods and systems for mitigating the interference on a received signal by providing a receiver having a filter, an equalizer with a truncated response time and a symbol mapper using a symbol mapping technique that takes advantage of noise correlation produced by the equalizer by adjusting symbol mapping boundaries accordingly.

22 Claims, 7 Drawing Sheets

METHODS AND SYSTEMS FOR SYMBOL ESTIMATION IN A RECEIVER

BACKGROUND OF THE INVENTION

1. Field of Invention

This invention relates to methods and apparatus for symbol estimation and a receiver.

2. Description of Related Art

As digital wireless communication systems are deployed around the world, the importance of providing clear and cost-effective communication services increases. Various obstacles include mitigating the effects of inter symbol interference (ISI) and co-channel interference (CCI) which result when transmitted signals travel along several paths to one or more intended receivers. When the difference in path lengths are relatively small, the multiple signal images arrive at almost the same time. However, as the difference in path lengths increase, the multiple signal images can appear as echoes of the transmitted signal and give rise to ISI and CCI.

Currently, ISI and CCI multipath time dispersion is mitigated by using some form of equalization, such as linear equalization (LE), decision feedback equalization (DFE), maximum likelihood sequence estimation (MLSE), and the minimum mean square linear equalization (MMSE-LE) with MLSE equalization providing the best performance.

Digital equalizers work by taking periodic samples of the received multiple signal images and removing the destructive components which are disbursed over a period of time. However, as the length of time covered by an equalizer increases, the required complexity and processing power of the maximum likelihood equalizer becomes prohibitive. Therefore, the time period covered by an equalizer, or response time, is often truncated to be less than the impulse response time of the transmitted signal, which degrades the performance of the maximum likelihood equalizer. Accordingly, there is a need for systems and methods that better equalized signals with ISI using a truncated response time.

SUMMARY OF THE INVENTION

The present invention provides systems and methods for mitigating interference on a received signal by providing an equalizer having a truncated response time preceded by a linear filter which compensates for the truncated response time. The invention also provides methods and systems for mitigating the interference on a received signal by providing a receiver having a filter and equalizer with a truncated response time followed by a symbol mapping technique that takes advantage of noise correlation produced by the equalizer by adjusting symbol mapping boundaries accordingly.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

Figure 1:
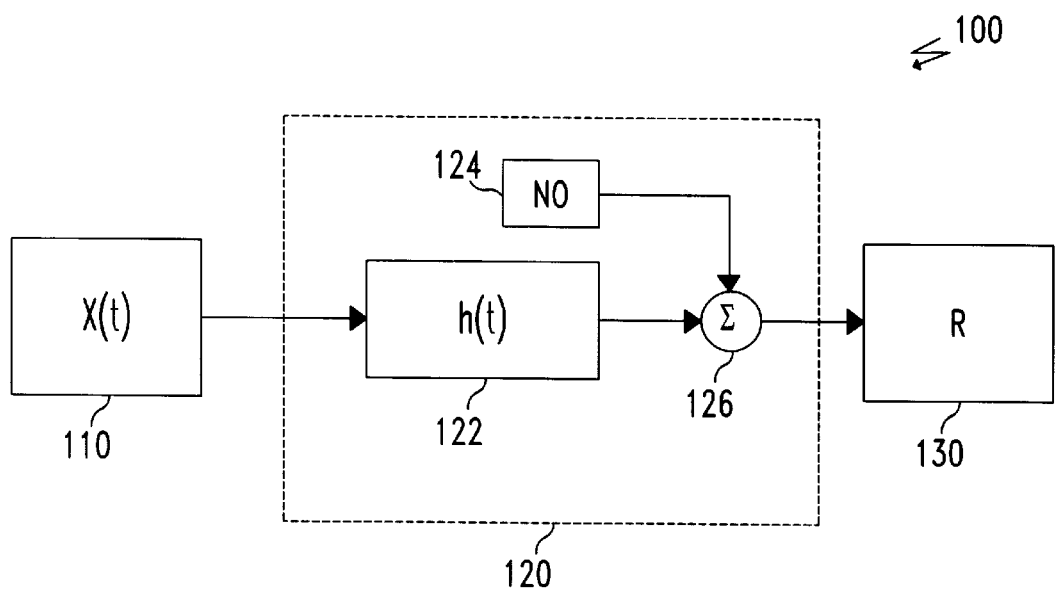
FIG. 1 is a block diagram of an exemplary digital communication system.

FIG. 1 shows an exemplary block diagram of a digital transmission system 100. The system 100 includes a digital transmitter 110, a transmission medium 120 and a digital receiver 130. In operation, the digital transmitter 110 can transmit a signal containing digital symbol information through the transmission medium 120 to be received by the digital receiver 130. The digital transmitter 110 is typically a wireless transmitter transmitting radio signals. However, the digital transmitter can be any one of a number of different sources such as a wireless transmitter, a transmission system employing wires such as a twisted wire pair, a transmitter adapted for transmitting across coaxial cable, an optical transmitter, a fiber-optic transmitter, a sonic transmitter or any other known or later developed device suitable for transmitting digital symbol information.

As the digital symbol information transmitted by the digital transmitter 100 propagates through the transmission medium 120, the signal is distorted according to the characteristics of the transmission medium 120. In the present example, the digital transmission medium 120 has a response filter h(t) 122, a noise generator $N_o$ 124 and a summing junction 126 that can sum the output of the response filter 122 and the noise source 124 which is then sent to the digital receiver 130.

The response filter 122 can be any combination of purposefully designed filters and any filter that results due to the incidental physical characteristics of the transmission medium 120. The noise source 124 can be any combination of artificial or naturally occurring sources capable of generating noise including average white Gaussian noise (AWGN) and co-channel interference from other sources. The summing junction 126 can be any device or element capable of receiving various signals and noise sources, combining and propagating the signals and noise to a digital receiver 130.

The digital receiver 130 is typically a wireless radio receiver. However, the digital receiver can be any one of a number of different receivers such as a wireless receiver, a reception system employing wires such as a twisted wire pair, a receiver adapted to receive signals from a coaxial cable, an optical receiver, a fiber optic receiver, a sonic receiver or any other known or later developed device suitable for receiving digital symbol information.

Figure 2:
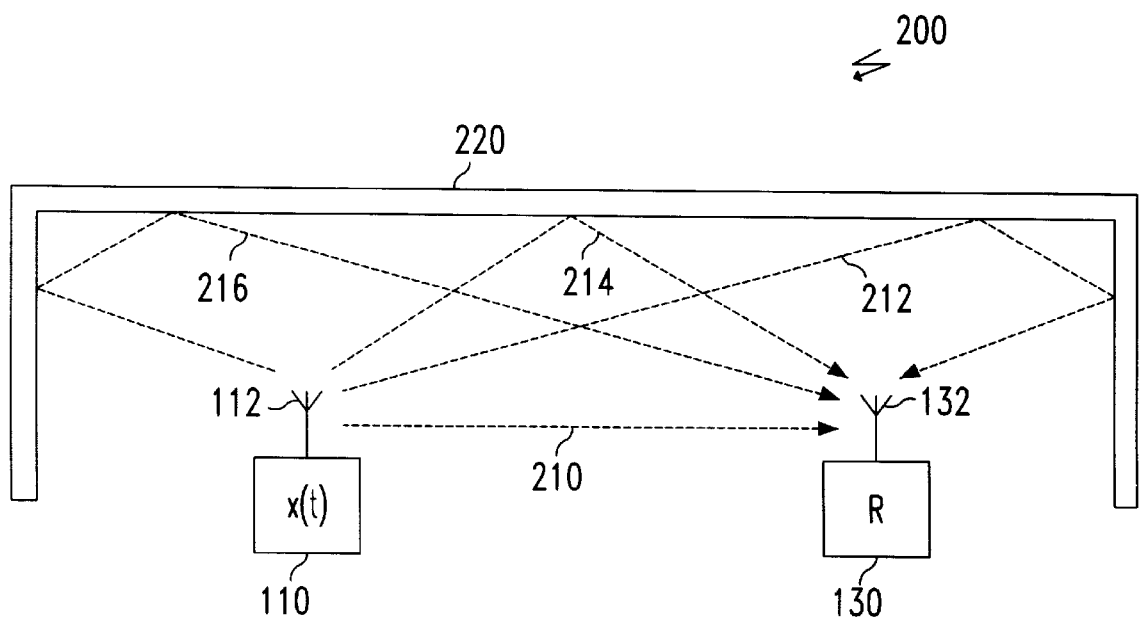
FIG. 2 illustrates an exemplary communication system with multiple transmission paths giving rise to inter symbol interference.

FIG. 2 is an exemplary block diagram of a wireless digital transmission system 200 for transmitting signals with digital symbol information. The wireless digital transmission system 200 includes a digital transmitter 110 with a transmitter antenna 112, a digital receiver 130 with a receiver antenna 132 and a structure 220 capable of reflecting wireless radio signals.

In operation, digital symbol information is transmitted from the digital transmitter 110 using the transmitter antenna 112 to the digital receiver 130 using the receiving antenna 132. As shown in FIG. 2, the digital symbol information transmitted by the digital transmitter 110 can reach the digital receiver through a variety of paths. In the exemplary diagram, digital symbol information reaches the digital receiver 130 directly through a first path 210 and also indirectly through a second path 212, a third path 214 and a fourth path 216 that result as the digital transmitter 110 transmits radio signals that subsequently reflect from the structure 220 to reach the digital receiver 130.

Figure 3:
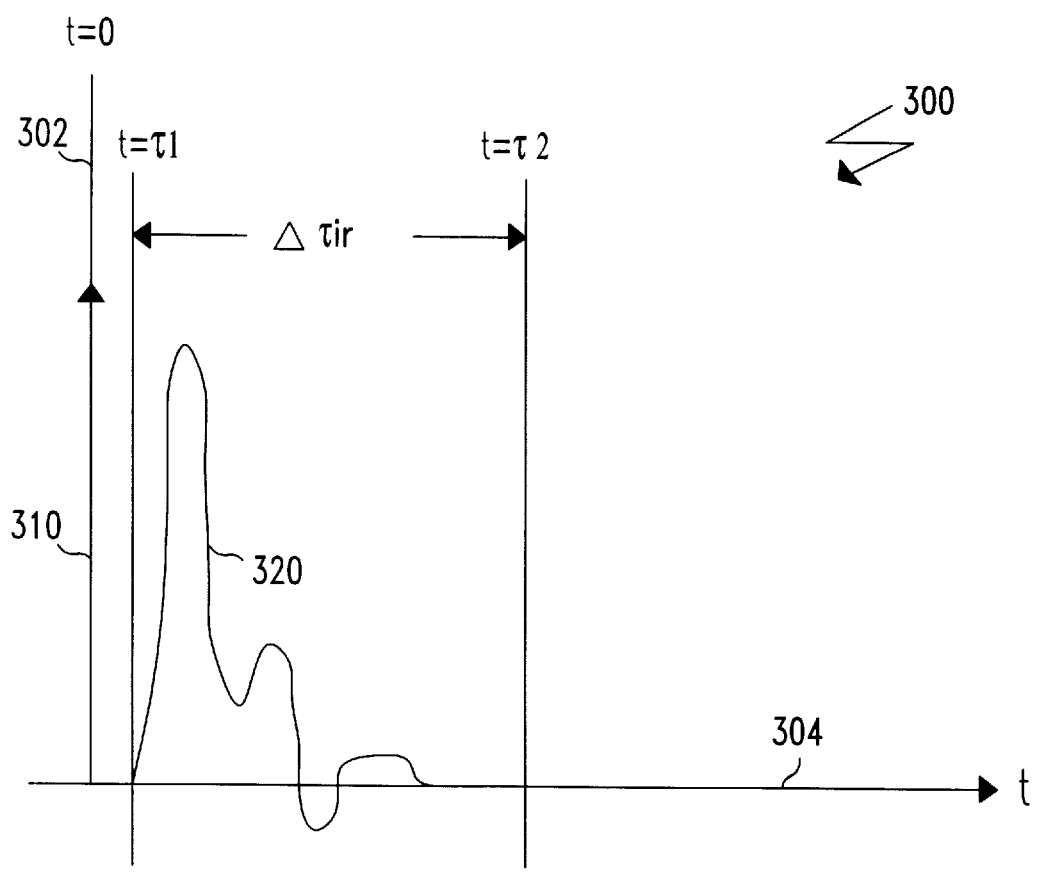
FIG. 3 illustrates an exemplary embodiment of a transmitted impulse signal and a resultant impulse response.

FIG. 3 shows a histogram with an amplitude axis 302 and a time axis 304 with an exemplary impulse signal 310 transmitted by the digital transmitter 110 and the resultant impulse response 320 produced by the transmission medium 120 as the impulse signal 310 propagates through the transmission medium 120. The impulse response 320 can be described by equation (1):

$$h(t) = \sum_k \gamma_k c(t - \tau_k) \qquad (1)$$

where $c(t-\tau_k)$ is the shaping pulse of the system, $\gamma_k$ is the complex amplitude of the k-th path, and $\tau_k$ is the delay of the k-th path. Usually, $\gamma_k$ is a complex Gaussian random variable and is independent for the different paths. As shown in FIG. 3, the impulse response 320 is delayed from the impulse signal 310 by a time delay $\tau_1$. The impulse response time $\Delta\tau_{ir}$ of the transmission medium 120 is the absolute difference between the start of the impulse response $\tau_1$ and the time at which the impulse response 320 effectively ends $\tau_2$ such that $\Delta\tau_{ir} = \tau_2 - \tau_1$.

Since the frequency responses of different paths in a transmission medium subject to multipath interference are presumed to be different, the frequency response of the transmission medium can be described by the equation:

$$H(f) = \int_{-\infty}^{+\infty} e^{-j2\pi ft} = C(f) \sum_k \gamma_k e^{-j2\pi f \tau_k} \qquad (2)$$

Formal proof of the frequency response and power spectral density of the transmission medium can be found in Y. Li, "Spatial-Temporal Processing for Wireless Systems with ISI and CCI: Receiving Filters and Equalizers," (May 27, 1999) incorporated herein by reference in its entirety.

Figure 4:
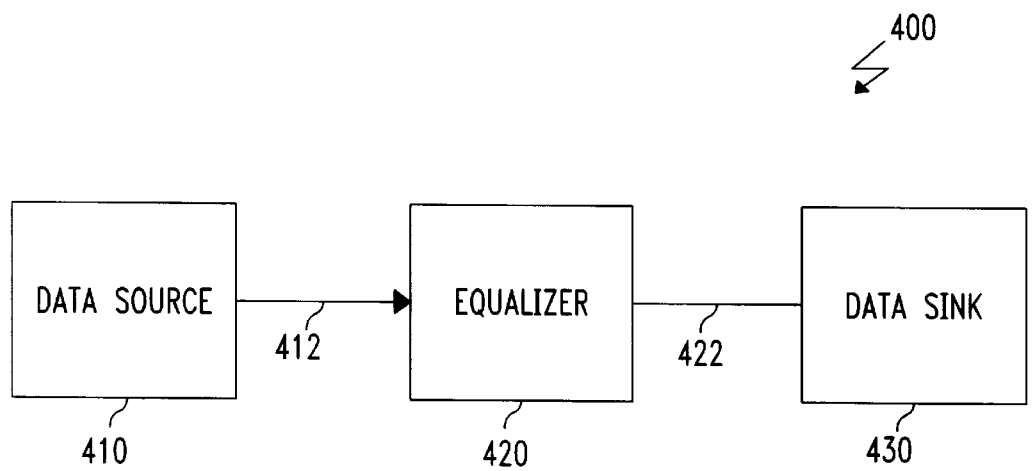
FIG. 4 is a block diagram of an exemplary digital symbol estimation system.

FIG. 4 shows an exemplary block diagram of an equalization system 400. The system 400 includes an equalizer 420 connected to a data source 410 via link 412 and to a data sink 430 via link 422. The equalizer 420 can convert a signal having digital symbol information along with AWGN, ISI and CCI provided by the data source 410, convert the signal to a stream of symbols, and export the symbols to the data sink 430.

The data source 410 can provide the equalizer 420 with a signal having digital symbol information along with AWGN, ISI and CCI. The signal containing the symbol information can be in any format, such as a digital wave form, an analog wave form, a modulated analog wave form such as a phase shift keying wave form, binary data, ASCII data or a word processing file. The data source 410 can be any one of a number of different types of data sources, such as a radio receiver receiving transmitted signal images, a computer, a storage device, or any combination of software and hardware capable of generating, relaying, or recalling from storage, signals in any format carrying information capable of being translated into symbols.

The data sink 430 receives the symbol estimates derived by the equalizer 420 via link 422. The data sink 430 can be any device capable of receiving symbols, symbol data, or symbol estimates such as a transceiver, a modem, or any combination of hardware and software capable of receiving, relaying, storing, sensing or perceiving symbols.

The links 412 and 422 can be any known or later developed device or system for connecting the data source 410 or the data sink 430 to the equalizer 420. Such devices include electrical wires, optical conduits, a direct serial/parallel cable connections, a connection over a wide area network or local area network, a connection over an intranet or an extranet, a connection over the Internet, or a connection over any other distributed processing network or system. Additionally, the input link 412 or the output link 422 can be software devices linking various software systems. In general, the links 412 and 422 can be any known or later developed connection, computer program, or structure usable to connect the data source 412 or the data sink 422 to the equalizer 420.

In operation, signals can be input from the data source 410 using link 412. The equalizer 420 can receive the information in any format, such as a digitized modulated signal. The equalizer can then take the signal containing symbol information and estimate a stream of symbols. Symbol estimation can be performed by first filtering the input data and then processing the filtered data using a T-space processor. As the equalizer 420 produces symbols, the equalizer 420 passes the symbols to the data sink 430 via link 422.

For the equalizer 420 to produce the most accurate symbol estimations, the equalizer 420 must have a response time greater than or equal to the impulse response time of the input data. The response time of an equalizer is the amount of time samples the equalizer 420 stores at any given moment. For example, an equalization system sampling an input signal once every millisecond and capable of storing and processing one hundred (100) samples at a time has a response time of one hundred (100) milliseconds.

However, the complexity of an equalizer increases exponentially with the length of the response time. In systems with limited resources, it can be impossible to process a received signal if the equalizer must incorporate the entire impulse response of the received signal. Therefore, equalizers often must truncate the impulse response of the received signal.

Figure 5:
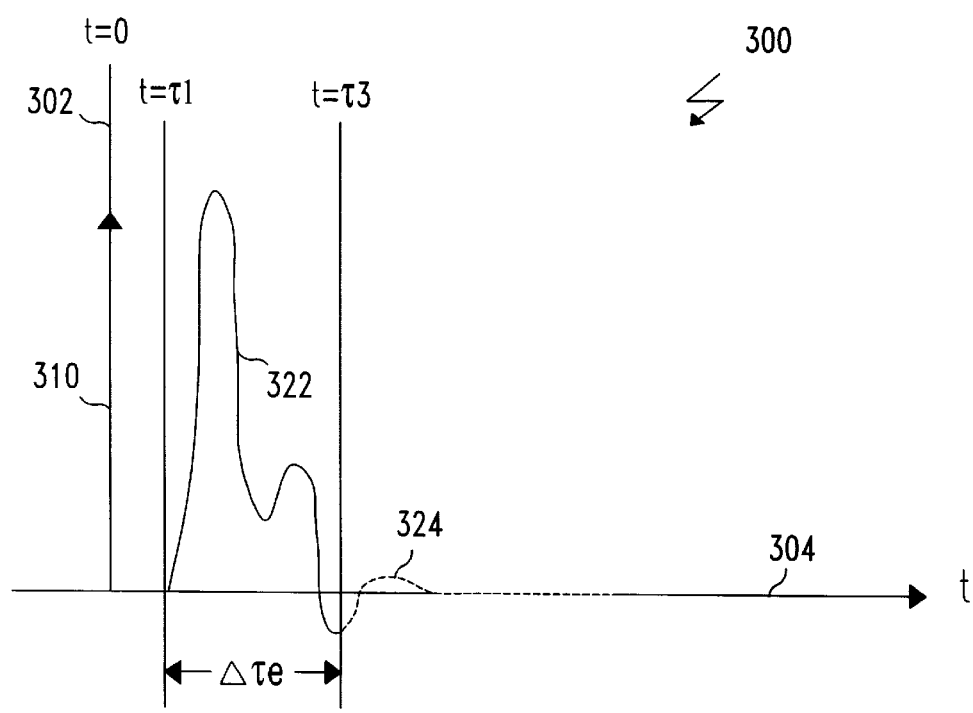
FIG. 5 illustrates an exemplary embodiment of an impulse signal and a resultant impulse response truncated by an equalizer with an inadequate response time.

FIG. 5 is a exemplary histogram illustrating an impulse response of a received signal truncated by the shorter response time of an equalizer 420 at a given instant of time. The impulse response is divided into a first portion 322 accounted for by the equalizer's response time, denoted by $\Delta\tau e$, and a second portion 324. With channel truncation arises two problems. The first problem is that, given the second portion 324 is not considered, not all information from the received data is simultaneously used. The second problem is that any noise accompanying the received data becomes highly correlated with the received data in a T-space processor incorporated in the equalizer 420. Because T-space processors are usually implemented using Viterbi techniques, and since Viterbi techniques do not account for noise correlation, large performance degradation occur and the symbol estimates are less likely to be accurate.

Figure 6:
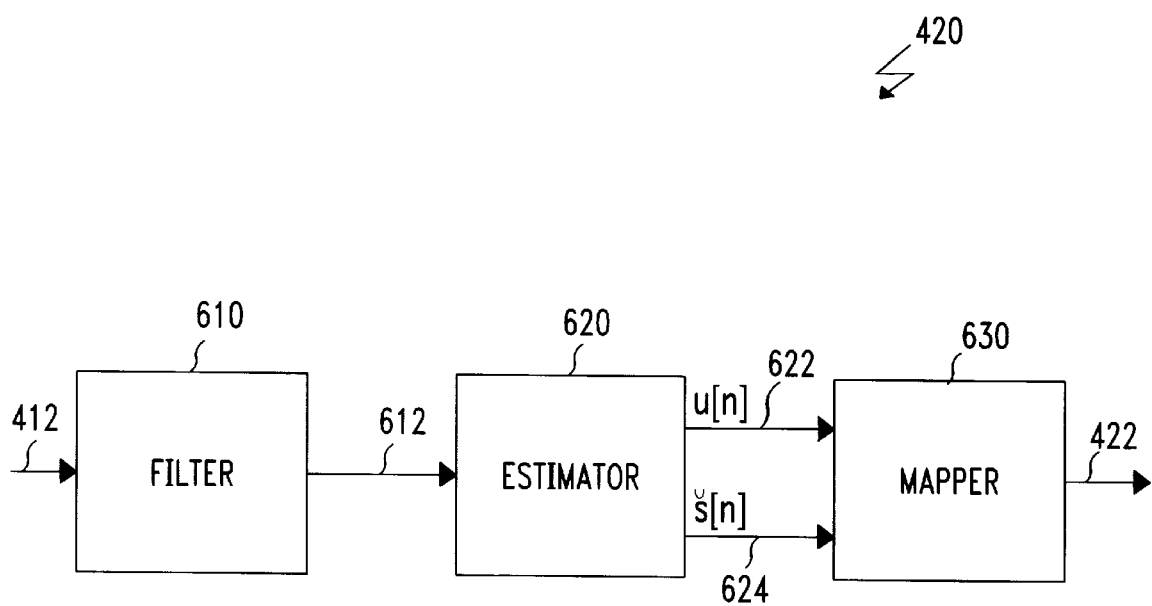
FIG. 6 is a block diagram of a first exemplary symbol estimator according to the present invention.

FIG. 6 is a block diagram of an exemplary equalizer 420 according to the present invention for sub-optimally decoding symbol estimates using a T-space processor that truncates the impulse response of a received signal. The equalizer includes a filter 610 connected to an estimator 620 via link 612 and a mapping device 630 connected to the estimator 620 via links 622 and 624.

Generally, equalizers operate by filtering a received signal containing symbol information, estimating a stream of symbol vectors, and then mapping each symbol vector to symbols. The mapping process can be accomplished by equating each symbol vector to the nearest recognized symbol in a constellation of symbols. For example, in a system with four symbols (−1,−1), (+1,+1), (+1,−1) and (−1,−1), a symbol vector (0.5,1.5) maps to symbol (+1,+1). Likewise, the vector (−0.1,−0.03) maps to symbol (−1,−1). The mapping boundaries to the exemplary constellation are the axis of the constellation which form four quadrants representing separate decision spaces for each symbol.

However, as noise becomes correlated by an equalizer that truncates the impulse response of a received signal, the axis no longer represent the best decision boundaries. The present invention compensates for correlated noise by appropriately adjusting the decision boundaries for each symbol vector in the stream of symbol vectors to reduce the symbol mapping error rate.

In operation, the filter 610 receives a signal containing symbol information, noise and interference via link 412. To optimize performance, the filter should be an optimum receive filter F0(f) which, for a single receive channel, can be described by equation (3):

$$F_0(f) = H_o^*(f) - \sum_{l=1}^{L} c_l(2\pi fT) H_l^*(f), \qquad (3)$$

where H (f) is the frequency response of each path in a transmission medium and $c_l(2\pi fT)$ is determined by the received signal, or channel, statistics. Proof of the optimum receive filter for a signal channel can be found in Y. Li, "Novel Symbol of Estimation Approaches for Wireless Systems with ISI and CCI."

The optimum receive filter frequency response can be extended to systems with multiple sensors or receivers and can be described by equation (4):

$$F_{om}(f) = H_{om}^*(f) - \sum_{l=1}^{L} c_l(2\pi fT) H_{lm}^*(f), \qquad (4)$$

for m=1, 2, . . . , M, where M is the number of sensors or antennae. For flat fading channels, the optimum receive filter is of the form:

$$F_o(f) = w_1 {}^* C^*(f), \qquad (5)$$

where $w_1$ is defined as $$w_1 = a_0 - \sum_{l=1}^{L} c_l^*(2\pi Tf) a_l \qquad (6)$$

$$= a_0 - c^*(2\pi Tf) A$$

$$= (I - A(A^H A + N_o I)^{-1} A^H) a_0$$

where $w_1$ is the weighting vector. For a flat fading channel with an adaptive antenna array, the optimum receive filter is described by equation (7):

$$F_o(f) = w_2 {}^* C^*(f), \qquad (7)$$

where $w_2$ equals $$w_2 = (\hat{A}\hat{A}^H + N_o I)^{-1} A^H) a_0, \qquad (8)$$

where $\hat{A} = (a_0, A)$.

After the filter 610 filters the input signal, the filtered signal is then received by the estimator 620 via the link 612. The estimator 620 can be a T-space processor implementing a MMSE-LE with a frequency response:

$$H_{MMSE-LE}(\omega) = \frac{1}{r(\omega) + N_o}, \qquad (9)$$

where r(ω) is determined by the channel statistics and $N_o$ is the noise portion of the received signal. After receiving the filtered signal, the estimator 620 can then produce observed vectors of the form:

$$z[n] = s_0[n] + u[n], \qquad (10)$$

where $s_0[n]$ is the symbol information portion, or desired signal, and u[n] is the noise portion containing the residual ISI, CCI and AWGN. The symbol information portion $s_0[n]$ and the noise portion u[n] can then sent to the mapping device 630 via links 624 and 622 respectively. While FIG. 6 shows two separate links 622 and 624 for transmitting symbol estimates and noise to the mapping device 630, it is to be appreciated that the symbol estimates and the noise may be sent over a single link.

After the mapping device 630 receives a string of observed vectors, the mapping device 630 then manipulates the decision space that maps the observed vectors to symbols. The mapping device 630 takes advantage of the correlation of the noise portion u[n] with the symbol information portion $s_0[n]$ to produce a more accurate result than is otherwise possible. To exploit the noise correlation, the mapping device 630 uses joint decisions, rather than symbol by symbol decisions, to estimate any given symbol. That is, for a particular observed vector z[n], the mapping device 630 estimates a symbol using the symbol information portion s[n] and noise portion u[n] of the observed vector z[n] plus a number of noise portions u[n−1] to u[n−p] corresponding to a number p of other observations.

The joint decision process can be accomplished by finding the symbol estimate š[n] that minimizes the value:

$$(z_p[n] - \check{s}_p[n])^H R_p^{-1}(z_p[n] - \check{s}_p[n]) \qquad (11)$$

where $$R_p = (u[n+i]u^*[n+j])_{ij=0}^{p}, \qquad (12)$$

and where $$z_p[n] = \begin{pmatrix} z[n] \\ \vdots \\ z[n-p] \end{pmatrix}, \quad (13)$$

$$\check{s}_p[n] = \begin{pmatrix} \check{s}[n] \\ \vdots \\ \check{s}[n-p] \end{pmatrix} \text{ and}$$

$$u_p[n] = \begin{pmatrix} u[n] \\ \vdots \\ u[n-p] \end{pmatrix},$$

where p is the number of extra observations used in any symbol estimation, $R_p$ is the correlation matrix for the different spectral components in the filtered signal, $z_p[n]$ is the observed vector, $\check{s}_p[n]$ is the estimated symbol vector and $u_p[n]$ is the noise vector.

While equations 12–14 above infer that each symbol estimation relies on noise and interference components occurring after the corresponding observation, any combination of noise and interference occurring before or after may be used without departing from the spirit and scope of the invention.

Figure 7:
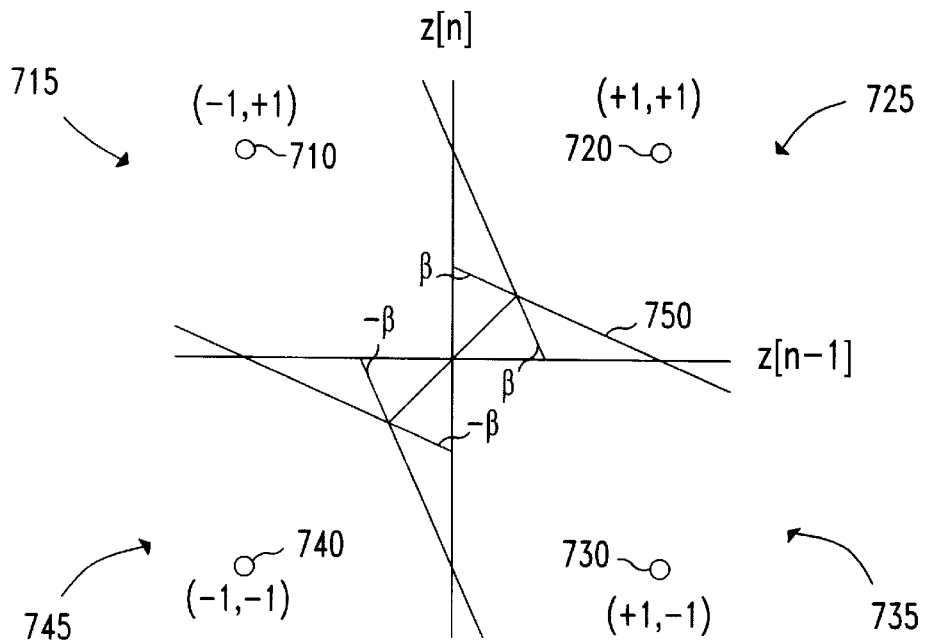
FIG. 7 depicts a symbol constellation with a first exemplary decision boundary for the symbol estimator of FIG. 6.
Figure 8:
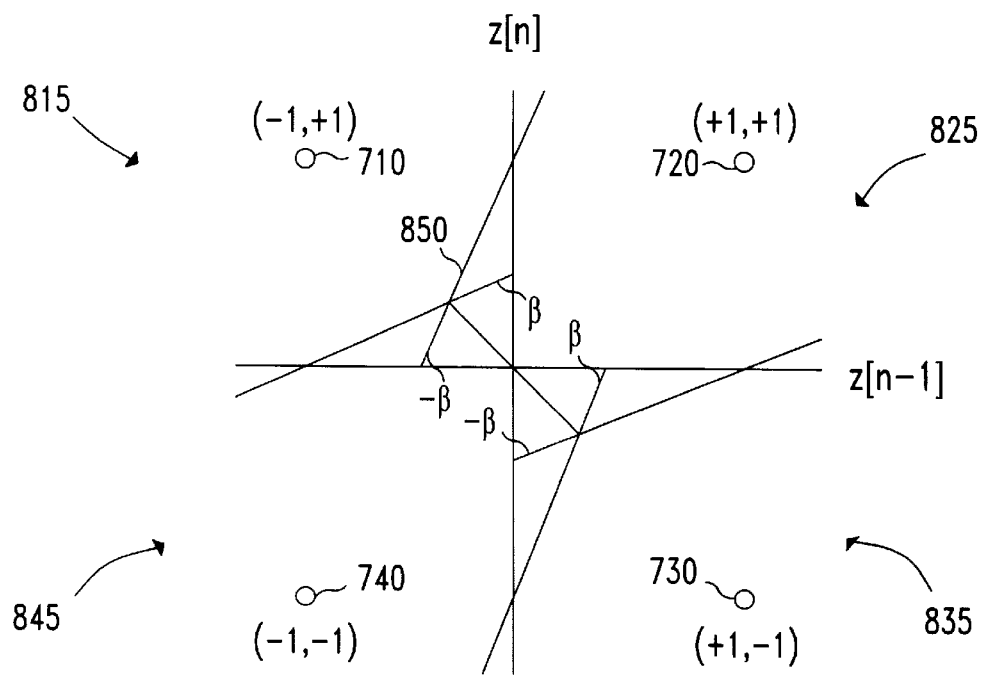
FIG. 8 depicts a symbol constellation with a second exemplary decision boundary for the symbol estimator of FIG. 6.

Upon receiving the requisite number of observations, the mapping device 630 then tailors a decision space that will map the observed vector to the symbol estimate. FIGS. 7 and 8 show the effect of the correlated noise and interference on the decision regions of a decision space for a MMSE-LE equalizer receiving a stream of binary symbols using two extra observations (i.e., p=2). The resulting joint decision correlation matrix $R_2$ of the noise can be described by:

$$R_2 = \begin{pmatrix} 1 & -\beta \\ -\beta & 1 \end{pmatrix}, \quad (14)$$

where β is a value corresponding to the amount of correlation between the symbol estimates and the noise.

FIG. 7 shows an example of a constellation for a receiver receiving binary symbol information with four constellation points (−1, +1) 710, (+1, +1) 720, (+1, −1) 730 and (−1, −1) 740 representing the four possible symbol transitions of observations z[n] to z[n−1]. The estimation space of FIG. 7 is divided into four separate regions by a complex boundary line 750 (denoted by the solid lines). The complex boundary line 750 varies with the correlation of u[n] with the symbol information estimate š[n]. In the example of FIG. 7, the noise is positively correlated with the symbol estimates. As a result, the decision regions 715, 725, 735 and 745 corresponding to points 710, 720, 730 and 740 respectively are modified as shown.

In contrast to the positively correlated noise of FIG. 7, FIG. 8 shows an example of a receiver receiving binary symbol information where the noise is negatively correlated with the symbol estimates. In this example, a second complex decision boundary 850 is determined by the mapping device 630 to produce four decision regions 815, 825, 835 and 845 corresponding to constellation points 710, 720, 730 and 740 respectively. While FIGS. 7 and 8 depict mapping spaces for a receiver receiving binary symbols with correlated noise, when the noise is not correlated with the input signal, i.e., β=0, the complex decision boundaries 750 and 850 become the axis z[n] and z[n−1].

It is to be appreciated that decision boundaries 750 and 850 for FIGS. 7 and 8 can become increasingly complex as more observations are used (i.e. p increases). Furthermore, it is to be appreciated that the decision boundaries for systems with more complex constellations such as QAM and OPSK will necessarily produce more complex decision boundaries.

Figure 9:
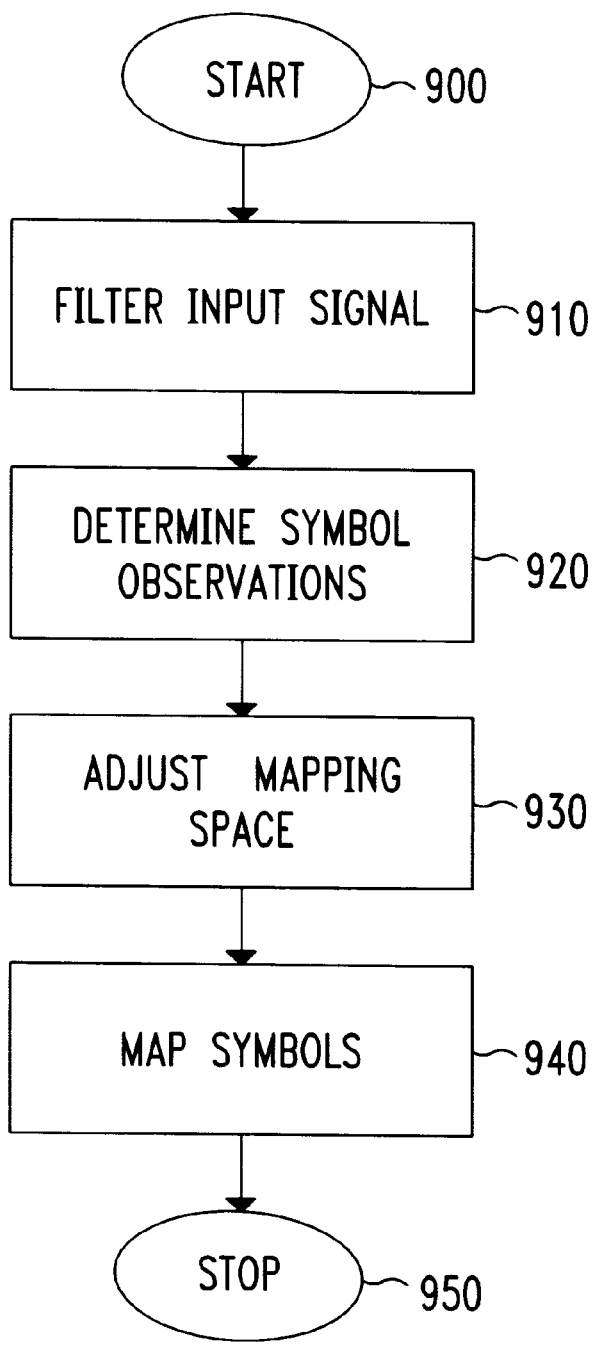
FIG. 9 is a flowchart outlining a first exemplary method for estimating symbols according to the present invention.

FIG. 9 shows a flowchart outlining a first exemplary process to estimate symbols from a received signal containing a symbol information portion and a noise and interference portion. The process starts in step 900 and proceeds to step 910 where the received signal is filtered. The filter of the exemplary embodiment uses a optimal matched filter, however, any filtering technique may be used without departing from the spirit and scope of the invention. The process continues to step 920.

In step 920, the filtered signal is used to provide observations having a symbol portion and a noise and interference portion. Step 920 can be implemented using a Viterbi technique, however, any technique capable of producing observations having symbol portions and noise and interference portions can be used without departing from the spirit and scope of the invention. The process continues to step 930.

In step 930, decision boundaries mapping each observed vector to a symbol are adjusted to take advantage of the noise correlation. In particular, for each observed vector in a plurality of observations, the mapping space for any observed vector z[n] will use the signal portion s[n], noise and interference portion u[n] and the noise and interference portions from one or more other observations $z[m]_{m \neq n}$ to modify the decision boundaries of the constellation. The process continues to step 940.

In step 940, symbols are selected by mapping the observed vectors to symbol constellation points according to the decision boundaries generated in step 930. After the symbols are selected, the process stops in step 950.

Figure 10:
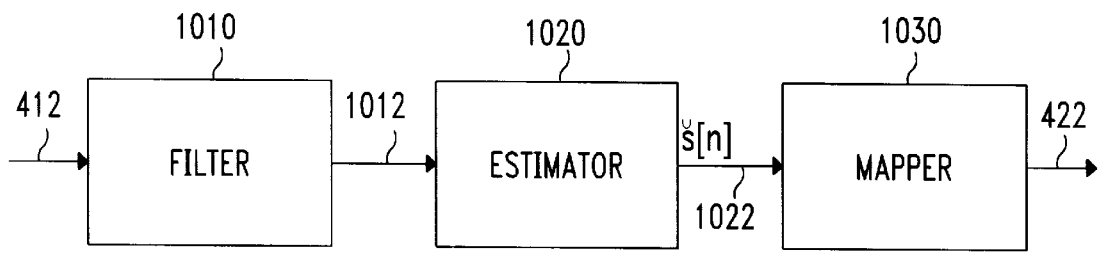
FIG. 10 is a block diagram of a second exemplary symbol estimator according to the present invention.

FIG. 10 shows a second exemplary embodiment of an equalizer 420 according to the present invention. The equalizer 420 includes a filter 1010 connected to an estimator 1020 via link 1012 with the estimator 1020 further connected to a mapping device 1030 via a second link 1022.

As discussed above, equalizers operate by filtering a received signal containing symbol information, estimating a stream of symbols, and then mapping each symbol vector to symbols. The received signal can contain ISI, CCI and AWGN along with the symbol information. Generally, a matched filter is the optimal filter for an equalizer. However, as the equalizer increasingly truncates the impulse response time of a received signal, the noise becomes increasingly correlated with the signal causing increasing error rates. The present invention operates by shaping the receive filter to remove the noise in the received signal in proportion to the symbol information. As the proportion of noise decreases, less noise is available to become correlated with the symbol information and the error rate decreases.

During operation, the filter 1010 receives a signal containing symbol information via link 412. The filter 1010 is a linear filter with the frequency response described by equation (15):

$$H_{linear}(\omega) = \frac{1}{r(\omega) + N_0 \Delta}, \quad (15)$$

where r(ω) is determined by the channel statistics.

Given that the channel statistics for a received signal can vary for systems employing multiple sensors or antennae as well as for systems that adaptively weight received signals, r(ω) varies accordingly.

The optimum Δ for the filter 1010 depends on the response time of the following estimator 1020. If there is no constraint on the length of the following estimator, that is, the estimator does not truncate the impulse response of the input signal, then Δ=0 and the linear filter reverts to a matched filter. As the estimator 1020 increasingly truncates the impulse response of the signal, the value of Δ increases. When the length of the following estimator is very short, Δ approximately equals one. By carefully selecting Δ, the linear filter of equation (15) effectively maximizes the signal to noise ratio at all frequency components of the received signal.

Once the input signal has been filtered, the filtered signal is provided to the estimator 1020 via link 1012. The output of the filter 1010 can be expressed by equation (16):

$$z[n]=s_0[n]+u[n],\qquad(16)$$

where $s_0[n]$ is the symbol information portion, or desired signal, and $u[n]$ is the noise and interference portion containing the residual ISI, CCI and AWGN.

The estimator 1020 then processes the filtered signal to produce a stream of symbol vectors which are then sent to the mapping device 1030 upon which the mapping device converts the symbol vectors to symbols. The estimator 1020 and the mapping device 1030 can be implemented using a single Viterbi device. While the exemplary embodiment uses a Viterbi device, any device capable of receiving filtered data and producing a stream of symbols may be used without departing from the spirit and scope of the invention. Furthermore, the estimator 1020 and mapping device 1030 can take the form of a maximum-likelihood sequence estimator (MLSE). Finally if the filter 1010 is a digital filter, the filter 1010, estimator 1020 and mapping device 1030 can all be implemented by a single Viterbi device.

Figure 11:
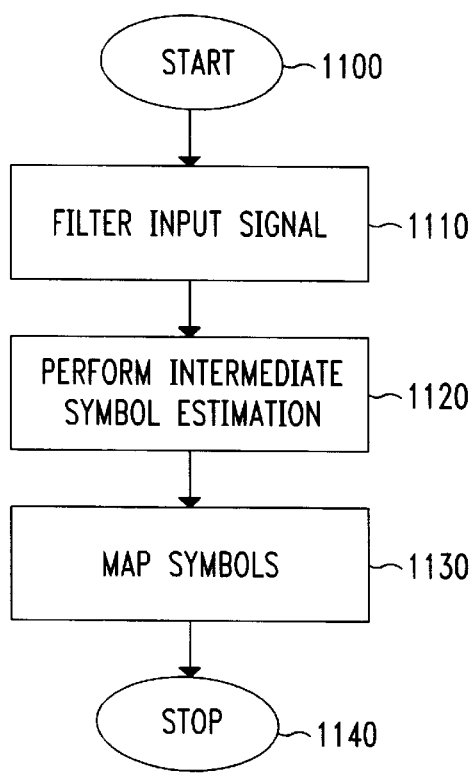
FIG. 11 is a flowchart outlining a second exemplary operation of a symbol estimation technique according to the present invention.

FIG. 11 shows a flowchart outlining a second exemplary process to produce a stream of symbols from an input signal containing symbol information. The processes starts in step 1100 and proceeds to step 1110 where the input signal is filtered using a linear filter of the form of equation (15). The process continues to step 1120.

In step 1120, symbol vectors are produced using the filtered input signal. The exemplary method used in step 1120 can be a Viterbi technique, however, any technique capable of receiving filtered data and producing a stream of symbol vectors may be used without departing from the spirit and scope of the invention. The process continues to step 1130.

In step 1130, symbols are selected by mapping the symbol vectors produced in step 1120 to symbols in a symbol constellation of symbols. In the exemplary method, the symbols are mapped by choosing the symbol constellation point closest to the symbol vector, however, it should be appreciated that mapping criteria can change and any mapping process that capable of translating symbol vectors to symbols can be used without departing from the spirit and scope of the invention. After the symbols are selected, the process stops in step 1140.

The symbol vector determining step 1120 and the symbol mapping step 1130 can together be performed using a Viterbi process and can take the form of a MLSE. Furthermore, the input filtering step 1110 may be incorporated with the symbol vector determining step 1120 and symbol mapping step 1130 again using a single Viterbi process. While the exemplary method uses a Viterbi technique to implement steps 1110–1130, any technique capable of filtering signals according to step 1110 then subsequently estimating symbol vectors and mapping symbols may be used without departing from the spirit and scope of the present invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for extracting symbols from a received signal containing symbol information, comprising:

filtering the received signal;

estimating a plurality of observed vectors based on the filtered signal, wherein each observed vector has a symbol portion and a noise portion; and determining at least a first symbol by using a symbol portion of a first observed vector of the plurality of observed vectors and at least one or more noise portions of at least one or more other observed vectors, wherein the step of determining includes adjusting a decision space that maps the symbol portion of the first observed vector to at least one or more symbol points in a constellation of symbol points based on the correlation of the first observed vector and the at least one or more noise portions of at least one or more other observed vectors.

2. The method of claim 1, wherein the step of determining at least a first symbol is further based on a correlation of a noise portion of the first observed vector and the at least one or more noise portions of at least one or more other observed vectors.

3. The method of claim 1, wherein the steps of estimating and mapping are performed using a Viterbi technique.

4. A method for extracting symbols from a received signal containing symbol information, comprising:

filtering the received signal using a linear filter and, wherein the frequency response of the linear filter is further based on a response time of the estimation step, wherein the received signal has at least a symbol information portion and a noise portion, and the linear filter substantially maximizes a signal to noise ratio of the received signal at substantially all frequency components;

estimating a plurality of symbol vectors using the filtered signal; and mapping the plurality of symbol vectors to symbols as the extracted symbols.

5. The method of claim 4, wherein the received signal further has an interference portion, and the linear filter substantially maximizes a signal to noise plus interference ratio of the received signal at substantially all frequency components.

6. The method of claim 4, wherein the frequency response of the linear filter is performed according to the following formula:

$$H_{linear}(\omega) = \frac{1}{r(\omega) + N_o \Delta},$$

wherein $r(\omega)$ is a measure of the received signal, $N_o$ is the average white Gaussian noise (AWGN) of the received signal, and Δ is a number ranging from 0 to 1.

7. The method of claim 4, wherein the steps of estimating and mapping use a Viterbi technique.

8. The method of claim 4, wherein the steps of filtering, estimating and mapping use a Viterbi technique.

9. The method of claim 5, wherein the signal to noise plus interference ratio is based on at least co-channel interference.

10. The method of claim 4, wherein the step of estimating uses an estimator having a response substantially shorter than an impulse response of the received signal.

11. The method of claim 10, wherein the estimator is based on a maximum likelihood sequence estimation (MLSE) technique.

12. A symbol estimation device for extracting symbols from a received signal containing symbol information, comprising:

a receive filter for filtering the received signal;

an estimation device that uses the filtered signal to estimate a plurality of observed vectors, wherein each observed vector has a symbol portion and a noise portion; and a decision making device that determines at least a first symbol using the symbol portion of a first observed vector of the plurality of observed vectors and one or more of the noise portions of one or more other observed vectors, wherein the decision making device determines the at least the first symbol by adjusting a decision space that maps the symbol portion of the first observed vector to at least one or more symbol points in a constellation of symbol points based on the correlation of the first observed vector and the at least one or more noise portions of at least one or more other observed vectors.

13. The device of claim 12, wherein the decision making device further determines at least the first symbol based on a correlation of a noise portion of the first observed vector and the at least one or more noise portions of at least one or more other observed vectors.

14. The device of claim 12, wherein the estimation device and the decision making device are implemented using a Viterbi technique.

15. A symbol estimation device for extracting symbols from a received signal containing symbol information, comprising:

a linear filter that filters the received signal and, wherein the frequency response of the linear filter is further based on a response time of the estimation step, wherein the received signal has at least a symbol information portion and a noise portion, and the linear filter substantially maximizes a signal to noise ratio of the received signal at substantially all frequency components;

an estimation device that estimates a plurality of symbol vectors using the filtered signal; and a decision making device that maps the plurality of symbol vectors to symbols as the extracted symbols.

16. The device of claim 15, wherein the received signal further has an interference portion, and the linear filter substantially maximizes a signal to noise plus interference ratio of the received signal at substantially all frequency components.

17. The device of claim 15, wherein the frequency response of the linear filter is performed according to the following formula:

$$H_{linear}(\omega) = \frac{1}{r(\omega) + N_o \Delta},$$

wherein $r(\omega)$ is a measure of the received signal, $N_o$ is the average white Gaussian noise (AWGN) of the received signal, and $\Delta$ is a number ranging from 0 to 1.

18. The device of claim 15, wherein the estimation device and the decision making device use a Viterbi technique.

19. The device of claim 15, wherein linear filter, the estimation device and the decision making device use a Viterbi technique.

20. The method of claim 16, wherein the signal to noise plus interference ratio is based on at least co-channel interference.

21. The method of claim 15, wherein the estimation device has a response substantially shorter than the impulse response of the received signal.

22. The method of claim 21, wherein the estimation device is based on a maximum likelihood sequence estimation (MLSE) technique.

* * * * *